Feb. 5, 1935. W. A. MENDELSOHN ET AL 1,990,459
OPTICAL INSTRUMENT
Filed Dec. 14, 1932
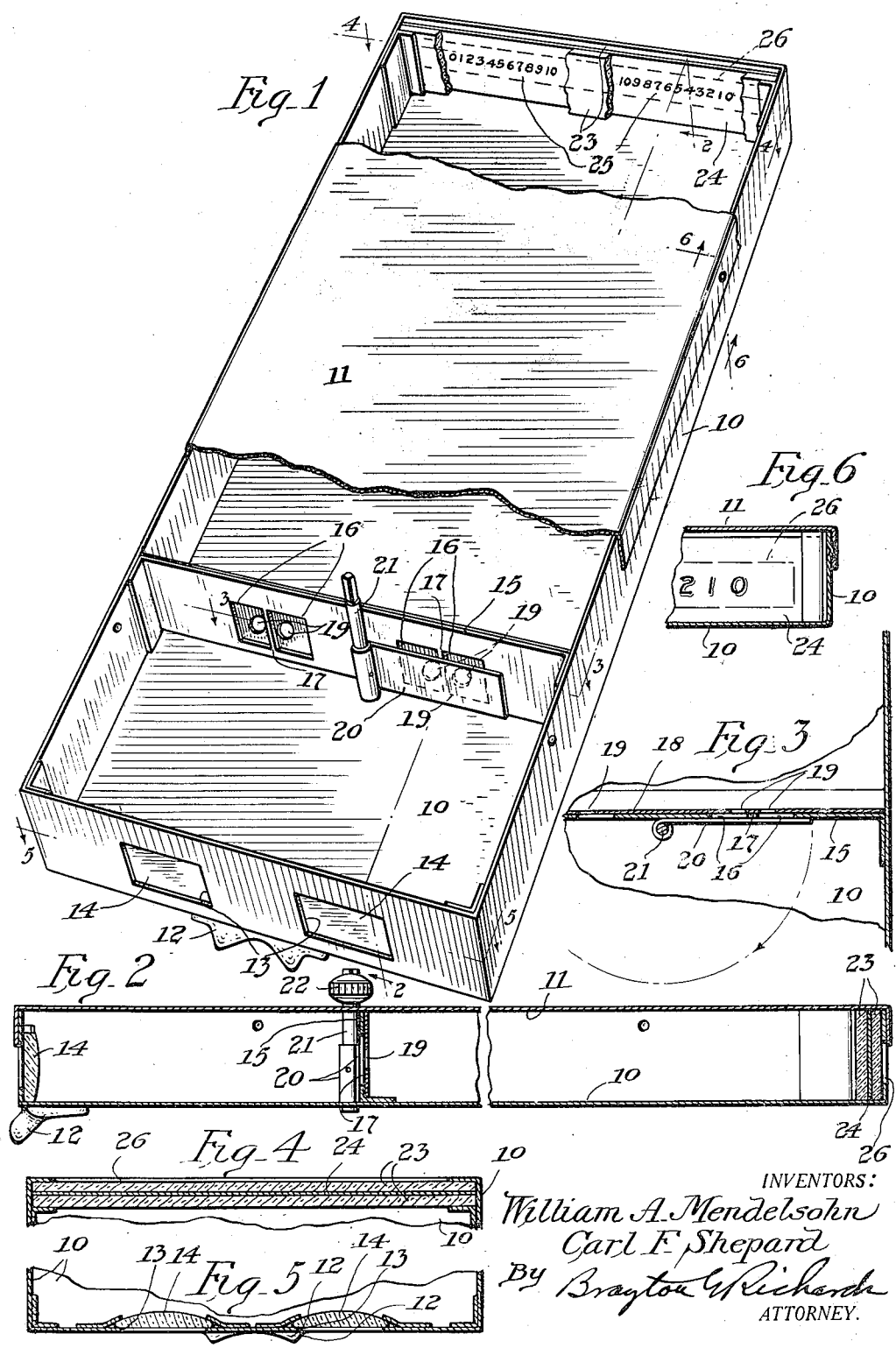
INVENTORS:
William A. Mendelsohn
Carl F. Shepard
By Brayton G. Richards
ATTORNEY.

Patented Feb. 5, 1935

1,990,459

UNITED STATES PATENT OFFICE 1,990,459

OPTICAL INSTRUMENT

William Arthur Mendelsohn and Carl F. Shepard, Chicago, Ill., assignors to New Era Optical Company, Chicago, Ill., a corporation of Illinois Application December 14, 1932, Serial No. 647,130

4 Claims. (Cl. 33—200)

The invention relates to improvements in optical instruments and has for its primary object the provision of an improved apparatus of the character indicated so constructed and arranged that the distance between the proper visual axis of the human eyes may be accurately and subjectively measured and determined for the purpose of accurately fitting eyeglasses thereto.

Other objects will appear hereinafter.

The invention consists in the combinations and arrangements of parts hereinafter described and claimed.

The invention will be best understood by reference to the accompanying drawing forming a part of this specification, and in which Fig. 1 is a perspective view of optical apparatus, with portions broken away, and illustrating a preferred embodiment of the invention;

Fig. 2 a partial enlarged longitudinal section taken substantially on the plane indicated by the line 2—2 on Fig. 1;

Fig. 3 an enlarged partial section taken substantially on the plane indicated by the line 3—3 on Fig. 1;

Fig. 4 an enlarged section taken substantially on the plane indicated by the line 4—4 on Fig. 1;

Fig. 5 an enlarged section taken substantially on the plane indicated by the line 5—5 on Fig. 1; and Fig. 6 an enlarged partial section taken substantially on the plane indicated by the line 6—6 of Fig. 1.

The embodiment of the invention illustrated in the drawing comprises an elongated shallow rectangular casing 10 which may conveniently be made of sheet metal and is provided with a readily removable cover member 11, as indicated.

At its forward end the casing 10 is provided with a downwardly and forwarding extending nose piece or rest 12 adapted to rest on the bridge of the nose of the patient and thus serving to fix the position of the casing relatively to the eye of the patient.

In its front wall, immediately above and adjacent the nose rest 12, the casing is provided with sight openings 13 arranged to fall opposite the eyes of the patient and said sight openings are preferably provided as shown with suitable plano-convex lenses 14, as indicated.

Arranged within the casing 10 is a transverse vertical partition or barrier 15 having two pairs of sight openings 16 therein, one pair being opposite each of the sight openings 13. The sight openings 16 are separated from each other by means of a vertical bar 17 and a strip of cardboard or the like 18 is arranged on the rear side of the partition 15, being provided with adjacent pairs of circular openings 19 on opposite sides of the bars 17, as shown. A swinging shutter 20 is arranged, as indicated, on a vertical shaft 21, equipped with an operating knob or handle 22 on the top of the casing 10 and whereby said shutter may be readily swung from one side to the other to cover one or the other pair of the sight openings 10, thereby interrupting the line of sight through the corresponding sight opening 13.

Arranged at the rear end of the casing 10 are two parallel transverse glass plates 23, having a scale member 24 imprisoned between them, said scale member 24 having two oppositely reading scales 25 positioned thereon, as shown. The rear wall of the casing 10 is provided with a light opening 26 behind the scales 25 to permit of the subjective reading of said scales by the patient.

As shown, the scales 25 are arranged with their zero points outwardly as shown, and the calibrations on said scales are so proportioned, with respect to the relative distances between the partition 15 and said scales and the eyes of the patient that the readings on each scale will indicate the distance of the visual axis of the corresponding eye from the central medial line between the eyes, so that the sum of the readings will indicate the actual distance between the visual axes of the eyes.

In use and in operation, the apparatus is placed with the nose piece 12 resting upon the bridge of the nose of the patient and the sight openings 13 positioned opposite the eyes of the patient, the casing 10 extending substantially horizontally or perpendicularly to the general plane of the face at the eyes, and with one pair of the sight openings 19 closed. The patient is then requested to announce the reading on the scale which he sees, using the dividing line between the corresponding openings 19 as the indication on the corresponding scale. Then the shutter 20 is swung to close the other pair of sight openings 19 and the patient requested to make a corresponding reading on the scale visible to him. The sum of these two readings will give the actual accurate distance between the proper visual axes of the patient's eyes for adjusting eyeglasses thereto. The arrangement disclosed thus constitutes a simple and effective apparatus for subjectively measuring the actual and proper distance between the eyes of a patient for the fitting of glasses. The specific form of the apparatus disclosed is a simple and effective one for the purpose.

While the preferred form of apparatus for carrying the invention into effect has been illustrated and described, this is capable of variation and modification without departing from the spirit of the invention. It is therefore not desired to limit the patent to the precise details disclosed, but to include therein also such variations and modifications as fall within the scope of the appended claims.

We claim:

1. Apparatus of the class described comprising two oppositely reading adjacent scales; means for positioning said scales in fixed relation with and at a distance from the eyes of a patient; a sight element interposed between each of said scales and the corresponding eye of the patient; and means for separately interrupting the line of sight from each eye to the corresponding scale whereby a patient may subjectively locate the visual axis of each eye on the corresponding scale.

2. Apparatus of the class described comprising two oppositely reading adjacent scales; means for positioning said scales in fixed relation with and at a distance from the eyes of a patient; a sight element interposed between each of said scales and the corresponding eye of the patient; and a swinging shutter for separately interrupting the line of sight from each eye to the corresponding scale whereby a patient may subjectively locate the visual axis of each eye on the corresponding scale.

3. Apparatus of the class described comprising a casing having a nose rest and sight openings at one end; two oppositely reading scales at the opposite end of said casing; an intermediate partition in said casing having sight openings therein substantially opposite those in the end of said casing and permitting view of said scales; and means for separately interrupting the line of sight from each eye to the corresponding scale whereby a patient may subjectively locate the visual axis of each eye on the corresponding scale.

4. Apparatus of the class described comprising a casing having a nose rest and sight openings at one end; two oppositely reading scales at the opposite end of said casing; an intermediate partition in said casing having sight openings therein substantially opposite those in the end of said casing; and a swinging shutter associated with said partition and arranged and adapted to close separately the sight openings therein whereby a patient may subjectively locate the visual axis of each eye on the corresponding scale.

WILLIAM ARTHUR MENDELSOHN.
CARL F. SHEPARD.